(12) United States Patent
Vo et al.

(10) Patent No.: US 12,639,620 B2

(45) Date of Patent: May 26, 2026

(54) REUSE OF MACHINE LEARNING MODELS

(71) Applicant: AT&T Intellectual Property I, L.P., Atlanta, GA (US)

(72) Inventors: Cuong Vo, Sachse, TX (US); Jeremy Fix, Acworth, GA (US); Jeffrey Dix, Rowlett, TX (US); Eric Zavesky, Austin, TX (US); Abhay Dabholkar, Allen, TX (US); Rudolph Mappus, Plano, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1135 days.

(21) Appl. No.: 17/486,798

(22) Filed: Sep. 27, 2021

(65) Prior Publication Data

US 2023/0101955 A1 Mar. 30, 2023

(51) Int. Cl.
| | |
|---|---|
| *G06N 20/00* | (2019.01) |
| *G06F 18/21* | (2023.01) |
| *G06F 18/2113* | (2023.01) |
| *G06F 18/22* | (2023.01) |

(52) U.S. Cl.
CPC ......... *G06N 20/00* (2019.01); *G06F 18/2113* (2023.01); *G06F 18/217* (2023.01); *G06F 18/22* (2023.01)

(58) Field of Classification Search
CPC ....... G06N 20/00; G06F 18/22; G06F 18/217; G06F 18/2113
See application file for complete search history.

(56) References Cited

U.S. PATENT DOCUMENTS

| | | | | |
|---|---|---|---|---|
| 11,763,154 B1* | 9/2023 | Lupesko | ............... | G06F 18/214 706/12 |
| 2014/0279769 A1* | 9/2014 | Goodwin | ............. | G06Q 10/067 706/14 |
| 2017/0330058 A1* | 11/2017 | Silberman | ............... | G06N 20/00 |
| 2020/0082299 A1* | 3/2020 | Vasconcelos | .......... | G06N 20/00 |
| 2020/0372304 A1* | 11/2020 | Kenthapadi | ............. | G06N 7/01 |
| 2021/0081819 A1* | 3/2021 | Polleri | .................. | G06N 5/022 |
| 2021/0081837 A1* | 3/2021 | Polleri | .................. | G06N 5/022 |

(Continued)

OTHER PUBLICATIONS

Arif, Muhammad Hassan, Muhammad Iqbal, and Jianxin Li. "Extracting and reusing blocks of knowledge in learning classifier systems for text classification: a lifelong machine learning approach." Soft Computing 23.23 (2019): 12673-12682. (Year: 2019).*

(Continued)

*Primary Examiner* — Andrew T Chiusano

(57) ABSTRACT

A method performed by a processing system including at least one processor includes defining a proposal for a proposed machine learning model, identifying an existing machine learning model, where the existing machine learning model shares a similarity with the proposed machine learning model, evaluating a fitness of the existing machine learning model for reuse in building the proposed machine learning model, building a new machine learning model that is consistent with the proposal for the proposed machine learning model by reusing a portion of the existing machine learning model, and monitoring a performance of the new machine learning model in a deployment environment.

20 Claims, 4 Drawing Sheets

200

(56) References Cited

U.S. PATENT DOCUMENTS

| | | | | |
|---|---|---|---|---|
| 2021/0081848 | A1* | 3/2021 | Polleri | G06F 11/3409 |
| 2021/0097405 | A1* | 4/2021 | McNeil | G06N 5/041 |
| 2022/0172099 | A1* | 6/2022 | Das | G06N 20/00 |
| 2022/0207349 | A1* | 6/2022 | Fusco | G06N 20/00 |
| 2022/0292391 | A1* | 9/2022 | Daly | G06N 5/04 |
| 2023/0023896 | A1* | 1/2023 | Schmidt | G06N 20/00 |
| 2023/0336340 | A1* | 10/2023 | Polleri | G06F 11/3003 |

OTHER PUBLICATIONS

Coston, Amanda, et al. "Fair transfer learning with missing protected attributes." Proceedings of the 2019 AAAI/ACM Conference on AI, Ethics, and Society. 2019. (Year: 2019).*

Jin, Xisen, et al. "Efficiently mitigating classification bias via transfer learning." arXiv preprint arXiv:2010.12864 (2020). (Year: 2020).*

Fix et al. "Automatic Discovery of Machine Learning Model Features", U.S. Appl. No. 17/486,770, filed Sep. 27, 2021.

Paulraj et al., "Governance Mechanisms for Reuse of Machine Learning Models and Features", U.S. Appl. No. 17/646,708, filed Dec. 31, 2021, 29 pages.

"Reusing machine learning models and the "no free lunch" theorem," Filament AI, Insights, www.filament.ai/2018/03/21/re-using-machine-learning-models/, Mar. 21, 2018, 3 pages.

* cited by examiner

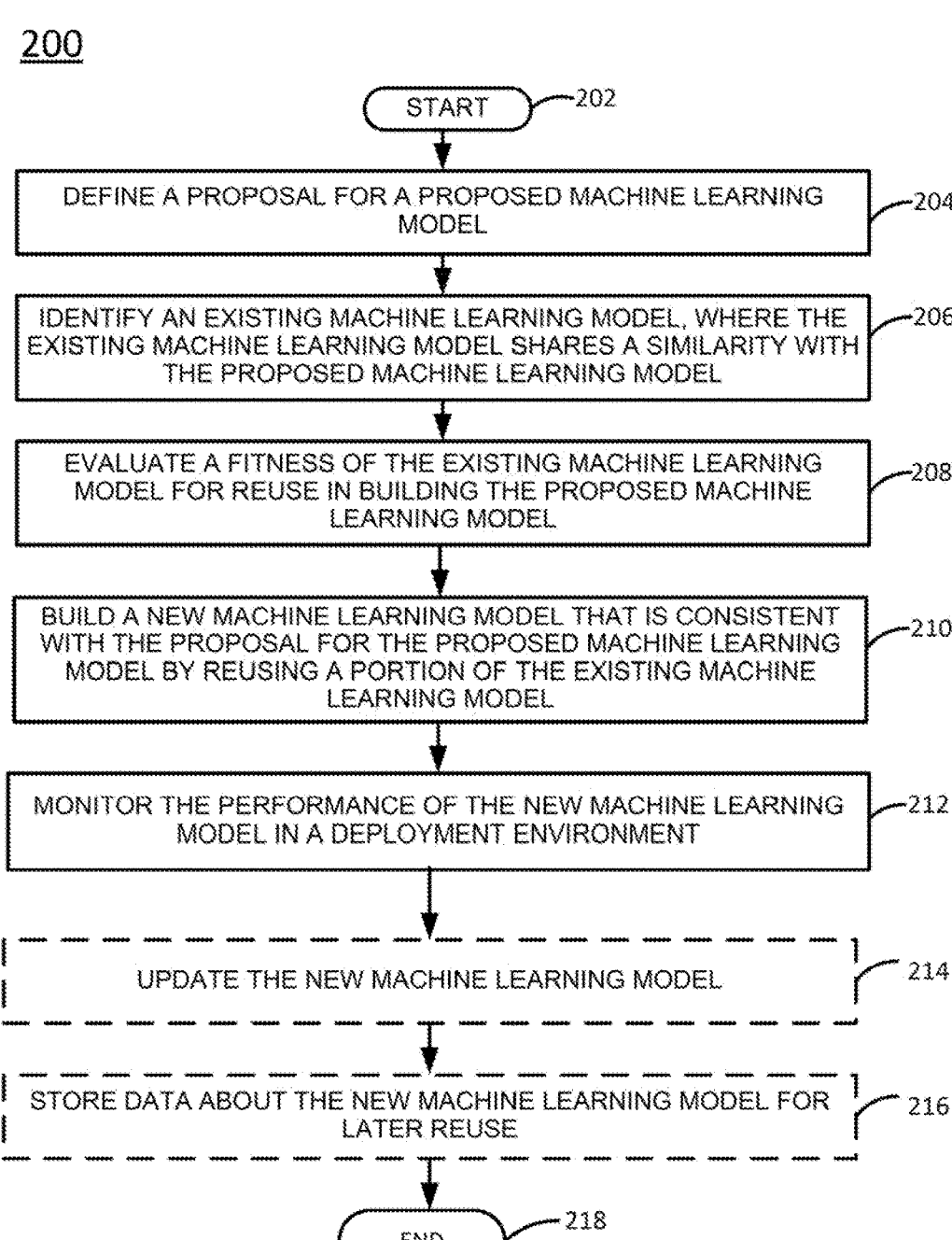

200

START ~202

DEFINE A PROPOSAL FOR A PROPOSED MACHINE LEARNING MODEL ~204

IDENTIFY AN EXISTING MACHINE LEARNING MODEL, WHERE THE EXISTING MACHINE LEARNING MODEL SHARES A SIMILARITY WITH THE PROPOSED MACHINE LEARNING MODEL ~206

EVALUATE A FITNESS OF THE EXISTING MACHINE LEARNING MODEL FOR REUSE IN BUILDING THE PROPOSED MACHINE LEARNING MODEL ~208

BUILD A NEW MACHINE LEARNING MODEL THAT IS CONSISTENT WITH THE PROPOSAL FOR THE PROPOSED MACHINE LEARNING MODEL BY REUSING A PORTION OF THE EXISTING MACHINE LEARNING MODEL ~210

MONITOR THE PERFORMANCE OF THE NEW MACHINE LEARNING MODEL IN A DEPLOYMENT ENVIRONMENT ~212

UPDATE THE NEW MACHINE LEARNING MODEL ~214

STORE DATA ABOUT THE NEW MACHINE LEARNING MODEL FOR LATER REUSE ~216

END ~218

FIG. 2

Topic

| Id | Name | FilterByTrigger | API_URL |
|---|---|---|---|
| 1 | Suggest Models | UseCaseView, NotebookNoEditor | https://pinnacle.web.att.com/... |
| 2 | Suggest Model Templates | UseCaseView, NotebookNoEditor | https://pinnacle.web.att.com/... |
| 3 | Code Snippets | ModelEditor | https://pinnacle.web.att.com/... |
| 4 | Suggest Features | ModelEditor | |

TopicList

| TopicId | ItemName | FilterByTag | DetailContent |
|---|---|---|---|
| 3 | Histogram of Data Distr. | Python, EDA | import matplotlib.pyplot as plt <br> ... |
| 3 | Time-Series Plot | R, EDA | <R code snippet for time series plot> |
| 3 | Confusion Matrix | Python, Fit, Train, Predict | <Python code for Confusion Matrix> |
| 3 | Confusion Matrix | R, Fit, Train, predict | <R code for Confusion matrix> |

REUSE OF MACHINE LEARNING MODELS

The present disclosure relates generally to machine learning, and relates more particularly to devices, non-transitory computer-readable media, and methods for automated discovery and hybridization of machine learning models for performant reuse.

BACKGROUND

Machine learning is a subset of artificial intelligence encompassing computer algorithms whose outputs improve with experience. A set of sample or "training" data may be provided to a machine learning algorithm, which may learn patterns in the training data that can be used to build a model that is capable of making predictions or decisions (outputs) based on a set of inputs (e.g., new data). Machine learning models may be used to automate the performance of repeated tasks, to filter emails, to provide navigation for unmanned vehicles, and to perform numerous other tasks or actions.

SUMMARY

The present disclosure broadly discloses methods, computer-readable media, and systems for automated discovery and hybridization of machine learning models for performant reuse. In one example, a method performed by a processing system including at least one processor includes defining a proposal for a proposed machine learning model, identifying an existing machine learning model, where the existing machine learning model shares a similarity with the proposed machine learning model, evaluating a fitness of the existing machine learning model for reuse in building the proposed machine learning model, building a new machine learning model that is consistent with the proposal for the proposed machine learning model by reusing a portion of the existing machine learning model, and monitoring a performance of the new machine learning model in a deployment environment.

In another example, a non-transitory computer-readable medium may store instructions which, when executed by a processing system including at least one processor, cause the processing system to perform operations. The operations may include defining a proposal for a proposed machine learning model, identifying an existing machine learning model, where the existing machine learning model shares a similarity with the proposed machine learning model, evaluating a fitness of the existing machine learning model for reuse in building the proposed machine learning model, building a new machine learning model that is consistent with the proposal for the proposed machine learning model by reusing a portion of the existing machine learning model, and monitoring a performance of the new machine learning model in a deployment environment.

In another example, a device may include a processing system including at least one processor and a non-transitory computer-readable medium storing instructions which, when executed by the processing system, cause the processing system to perform operations. The operations may include defining a proposal for a proposed machine learning model, identifying an existing machine learning model, where the existing machine learning model shares a similarity with the new proposed machine learning model, evaluating a fitness of the existing machine learning model for reuse in building the proposed machine learning model, building a new machine learning model that is consistent with the proposal for the proposed machine learning model by reusing a portion of the existing machine learning model, and monitoring a performance of the new machine learning model in a deployment environment.

BRIEF DESCRIPTION OF THE DRAWINGS

The teachings of the present disclosure can be readily understood by considering the following detailed description in conjunction with the accompanying drawings, in which:

FIG. 2 illustrates a flowchart of an example method for building and deploying a machine learning model, in accordance with the present disclosure;

FIG. 3 illustrates one example of a user interface for a tool that may assist a user in evaluating the features of existing machine learning models for reuse.

To facilitate understanding, similar reference numerals have been used, where possible, to designate elements that are common to the figures.

DETAILED DESCRIPTION

Figure 1:
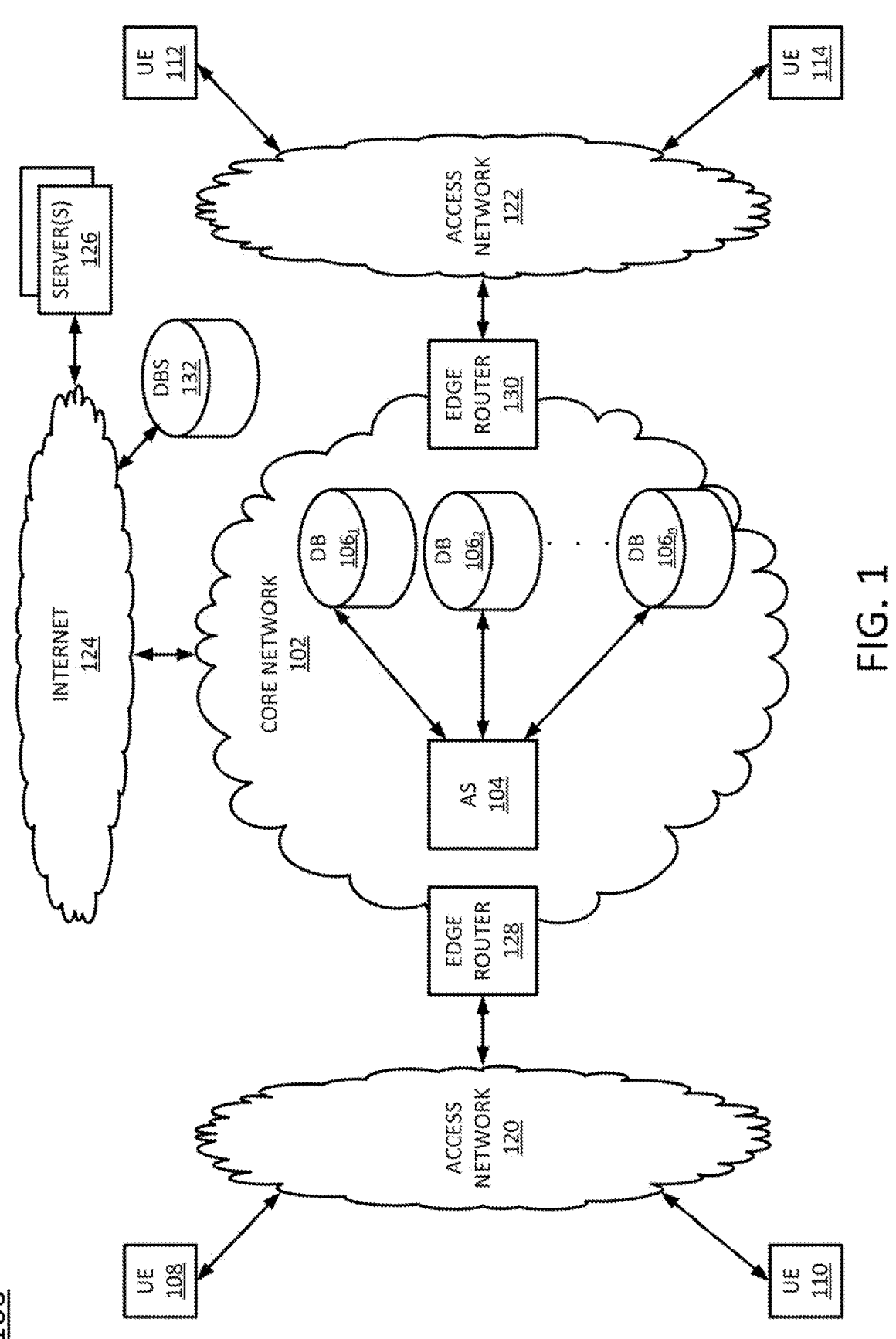
FIG. 1 illustrates an example system in which examples of the present disclosure for building and deploying a machine learning model may operate.

The present disclosure broadly discloses methods, computer-readable media, and systems for automated discovery and hybridization of machine learning models for performant reuse. As discussed above, machine learning models are trained using a set of training data to make predictions or decisions (outputs) based on a set of inputs (e.g., new data). When developing machine learning models that support a decision process, there are often opportunities to use previous solutions that fit well (e.g., that may have address similar decision processes). Thus, along the machine learning pipeline, there are many opportunities for model reuse.

For instance, machine learning models are often reused during the creation (e.g., building and training) phase. However, the deployment or runtime phase may also benefit from model reuse. For example, computing environments that are similar to previous computing environments, data sources that are similar to previously used data sources, and microservices that are similar to previously used microservices can be reused when deploying a new machine learning model. Downstream reusable application programming interface (API) connections may enable new machine learning models being deployed. However, it can be difficult to efficiently discover the upstream and downstream components of machine learning which may be reused in the serving stage of artificial intelligence deployment.

Examples of the present disclosure provide an automated means for discovering machine learning pipeline models which are similar to a machine learning pipeline model being developed or deployed. In one example, similarity may be evaluated based on similarities in parameters including model performance, model inputs, and model outputs. Comparison of these parameters may help to determine whether a new machine learning model being developed or deployed can be derived from an existing machine learning model. In some examples, intermediate insights from other upstream systems may identify and suggest examples for candidate machine learning models and features for reuse.

In a further example, once an existing machine learning model has been identified for reuse, the fitness of the existing machine learning model for adaptation to the platform of the new machine learning model may be evaluated. In one example, the fitness evaluation may also involve evaluation of appropriate weightings to apply when reusing the existing machine learning model.

In a further example, evaluation of a hybrid machine learning model (e.g., a machine learning model that reuses elements of other, existing machine learning models) against a proposed deployment may be automated. In this case, when the existing machine learning models which are reused change (e.g., due to discovery of bias, retraining, or other tasks), the changed models may be validated to confirm that the changed models still fit for reuse in the context of the new machine learning model. These and other aspects of the present disclosure are discussed in greater detail below in connection with the examples of FIGS. 1-4.

To further aid in understanding the present disclosure, FIG. 1 illustrates an example system 100 in which examples of the present disclosure for building and deploying a machine learning model may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, a plurality of databases (DBs) $106_1$-$106_n$ (hereinafter individually referred to as a "database 106" or collectively referred to as "databases 106"), and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 400 depicted in FIG. 4, and may be configured as described below. For example, the user endpoint devices 108, 110, 112, and 114 may each comprise a mobile device, a cellular smart phone, a gaming console, a set top box, a laptop computer, a tablet computer, a desktop computer, an application server, a bank or cluster of such devices, and the like. In one example, any one of the user endpoint devices 108, 110, 112, and 114 may be operable by a human user to provide guidance and feedback to the AS 104, which may be configured to build and deploy machine learning models by reusing components of existing machine learning models, as discussed in greater detail below.

In one example, one or more servers 126 and one or more databases (DBs) 132 may be accessible to user endpoint devices 108, 110, 112, and 114 via Internet 124 in general. The server(s) 126 and DBs 132 may be associated with Internet content providers, e.g., entities that provide content (e.g., news, blogs, videos, music, files, products, services, or the like) in the form of websites (e.g., social media sites, general reference sites, online encyclopedias, or the like) to users over the Internet 124. Thus, some of the servers 126 and DBs 132 may comprise content servers, e.g., servers that store content such as images, text, video, and the like which may be served to web browser applications executing on the user endpoint devices 108, 110, 112, and 114 and/or to AS 104 in the form of websites.

Figure 4:
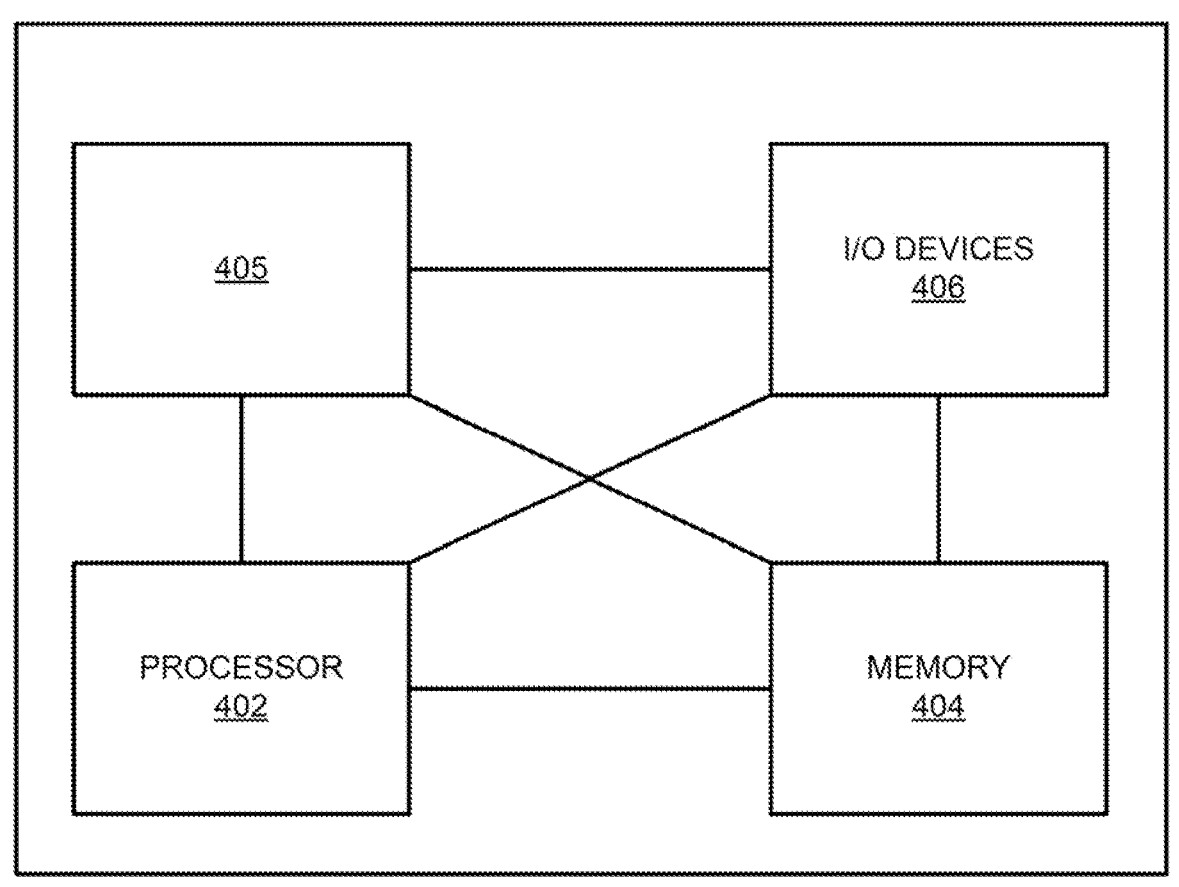
FIG. 4 illustrates an example of a computing device, or computing system, specifically programmed to perform the steps, functions, blocks, and/or operations described herein.

In accordance with the present disclosure, the AS 104 may be configured to provide one or more operations or functions in connection with examples of the present disclosure for building and deploying machine learning models by reusing existing machine learning models, as described herein. The AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, the AS 104 may be configured to build, train, and/or update new machine learning models by reusing components of existing machine learning models. In particular, the AS 104 may be configured to identify existing machine learning models which may share similarities with a proposal for a new machine learning model (e.g., similar input features, similar target output, similar use case, similar algorithm, etc.). For instance, in one example, the AS 104 may be programmed to compare the proposal for a new machine learning model against a repository of existing machine learning models and to identify components of the existing machine learning models which may be reused to build, train, and/or update the new machine learning model. Any existing machine learning models (or components thereof) which are identified as candidates for reuse may be validated against the proposal and ranked according to fitness for reuse, as discussed in greater detail below.

Existing machine learning models may be acquired from a plurality of sources. For instance, each of the DBs 106 and 132 may comprise a different source of existing machine learning models, components of which may be reused to create a new machine learning model (also referred to herein as a "hybrid" machine learning model, since the model may contain reused components of existing machine learning models as well as newly created, use case-specific components). As an example, DB 106$_1$ may contain whole machine learning models which may have been previously built and/or deployed; DB 106$_2$ may contain templates or generic frameworks which may be customized to create a variety of different machine learning models; DB 106$_n$ may contain excerpts or snippets of code (e.g., individual code blocks or functions) extracted from machine learning models which may have been previously built and/or deployed; and a DB 132 may contain input and/or output data features extracted from machine learning models which may have been previously built and/or deployed. Additional DBs may contain other types of data extracted from existing machine learning models. The DBs 106 and 132 may comprise proprietary databases controlled by an enterprise (e.g., a business, a university, or the like) for internal use or may comprise part of a marketplace or service to which users may subscribe.

In one example, the DBs 106 may comprise physical storage devices integrated with the AS 104 (e.g., a database server or a file server), or attached or coupled to the AS 104, in accordance with the present disclosure. In one example, the AS 104 may load instructions into a memory, or one or more distributed memory units, and execute the instructions for building and deploying machine learning algorithms by reusing existing machine learning models as described herein. One example method for building and deploying machine learning algorithms by reusing existing machine learning models is described in greater detail below in connection with FIG. 2.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

FIG. 2 illustrates a flowchart of an example method 200 for building and deploying a machine learning model, in accordance with the present disclosure. In one example, steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system in an Internet service provider network, such as processing system 402.

The method 200 begins in step 202 and proceeds to step 204. In step 204, the processing system may define a proposal for a proposed (e.g., first) machine learning model. In one example, the proposal defines a deployment need of the proposed machine learning model. For instance, the proposed machine learning model may be needed to identify candidates for a job opening, to filter email, to navigate an unmanned vehicle, or the like. In one example, the proposal may further define parameters of the proposed machine learning model, such as the features the proposed machine learning model will take as input, the target (e.g., prediction output) of the machine learning model, performance criteria (e.g., speed, deployment, quality, metrics for evaluation, etc.), source and/or target domain, and/or other parameters.

In one example, the processing system may define the proposal for the proposed machine learning model using inputs provided by a human user. For instance, the human user may provide the various parameters of the proposed machine learning model in response to prompts from the processing system.

In step 206, the processing system may identify an existing (e.g., second) machine learning model, where the existing machine learning model shares a similarity with the proposed machine learning model. In one example, the existing machine learning model may share a similarity with the proposed machine learning model when the input of the existing machine learning model is similar to the input of the proposed machine learning model and/or the target of the existing machine learning model is similar to the target of the proposed machine learning model. In further examples, the similarity may be based on similarities in users or in the datasets from which the inputs are extracted.

In one example, a shared similarity may be detected when metadata associated with the existing machine learning model matches metadata associated with the proposed machine learning model. For instance, the proposal for the proposed machine learning model may be tagged with metadata that indicates that the target of the proposed machine learning model is to identify job candidates for a data scientist position. Metadata associated with the existing machine learning model may also indicate that the target of the existing machine learning model is to identify job candidates for a data scientist position. In one example, matching metadata tags may be identical (e.g., "data scientist" versus "data scientist"); however, in other examples, the metadata tags may match on a semantic or conceptual level rather than match verbatim (e.g. "data scientist" versus "data analyst").

In one example, the similarity between the proposed machine learning model and the existing machine learning model may be assigned a score, and the existing machine learning model may be identified as similar to the proposed machine learning model when the score at least meets a predefined threshold score. For instance, each parameter by which similarity may be measured (e.g., input, target, users, datasets, etc.) may be assigned an individual score, and the individual scores may be combined to form a final score. In one example, an individual score may comprise a binary score (e.g., zero for no match, one for match). In another example, an individual score may comprise a value that falls on a scale (e.g., zero for no match, fifty for a semantic or conceptual match, one hundred for an identical match, and the like).

In yet another example, similarity may be measured between the output of the proposed machine learning model and the output of the existing machine learning model on the same input, where outputs that generate a similar distribution of predictions (e.g., binary, continuous, semantic, etc.) generate a score that indicates a higher similarity. In this example, the type, category, and/or ranges of output values need not be predetermined or aligned, because an algorithmic comparison (e.g., statistical correlation, higher-dimensional differences after embedding out output and input values, or simple absolute difference of values) may be executed by the system in a completely automatic process.

The individual scores may be combined by summing the individual scores, by taking an average of the individual scores, or by some other means. In a further examples, the individual scores may be weighted to reflect the parameters for which a match may be more significant (e.g., where target is more significant than users, assign a greater weight to the individual score for target than to the individual score for users).

In one example, discovery of similar existing machine learning models may lead to the discovery of optimizations which may have been applied to the existing machine learning models and which may be useful in applying to the proposed machine learning model. The optimizations in this case may change the structure of the associated machine learning model and/or may involve other feature engineering techniques.

In one example, the existing machine learning model may be acquired from one of a variety of sources. For instance, in one example, an existing machine learning model or extract, transform, and load (ETL) source may come from reusable APIs which have already been created. In another example, a crawler may search a repository of machine learning models for new entries. In a further example, if the inputs, outputs, and/or targets of the existing machine learning models are unknown, the processing system may attempt to automatically negotiate by evaluating a sample data frame associated with the existing machine learning model against the needs of the new machine learning model.

In step 208, the processing system may evaluate a fitness of the existing machine learning model for reuse in building the proposed machine learning model. In other words, the processing system may determine whether portions of the existing machine learning model may be reused to build the proposed machine learning model, thereby allowing the proposed machine learning model to be built in a more efficient manner.

In one example, evaluation of the fitness of the existing machine learning model may involve evaluating the input features of the existing machine learning model as a first-pass validation to measure drift, bias, other artifacts that may have been introduced into the existing machine learning model during prior training. In some examples, evaluating the fitness of the existing machine learning model may result in retraining the existing machine learning model (both for the sake of the existing machine learning model and also for reuse in the new machine learning model).

In one example, evaluation of the fitness of the existing machine learning model may involve evaluating how well the predictions generated by the existing machine learning model align with the predictions that the proposed machine learning model is intended to generate. In one example, the evaluation may include comparison data from external machine model evaluation sources which may be used to rank a plurality of existing machine learning models according to fitness. In further examples, the evaluation may include model ensemble models.

In one example, the fitness of the existing machine learning model may be performed automatically by querying downstream systems to understand and re-use the existing machine learning model in-place (e.g., via a uniform resource locator (URL) or authenticated call).

In another example, the fitness of the existing machine learning model may involve breaking apart machine learning models and presenting examples of inputs and outputs for the user to review manually. For instance, the processing system may employ tools that aid a user in understanding and correlating features of the model inputs and outputs.

FIG. 3, for instance, illustrates one example of a user interface 300 for a tool that may assist a user in evaluating the features of existing machine learning models for reuse. The user interface may list topics, or categories, comprising suggested elements of existing machine learning models which may be candidates for reuse (where the suggestions may be generated by the processing system or by an external system to which the processing system interfaces). Suggested topics may be identified by unique number and/or name. For instance suggested topics might include "Suggest Models" (e.g., entire existing machine learning models), "Suggest Model Templates" (e.g., generic machine learning model frameworks from which at least some existing machine learning models may have bene built), "Code Snippets" (e.g., individual code blocks or functions extracted from existing machine learning models), "Suggest Features" (e.g., data attributes or features from which existing machine learning models have learned), and/or other topics. Different topics may be filtered using different triggers (use case, editors, etc.) and may be reachable via different API URLs).

A user may select any individual topic listed in the suggested topics to bring up a list of individual items or elements corresponding to the topic. For instance, referring back to FIG. 3, selecting Topic Id "3" for "Code Snippets" may bring up a separate topic list including items with names such as "Histogram of Data Distribution," "Time-Series Plot," "Confusion Matrix," and/or other items. Different items may be filtered using different tags (e.g., different programming languages, different data analysis techniques, etc.) and may include unique descriptions indicating the natures of the different items (e.g., code snippets in specific programming languages and/or for different functions).

User feedback can be used to validate the fitness of the existing machine learning model (e.g., if the user rejects the outputs of the existing machine learning model, the rejection may result in the existing machine learning model being eliminated from consideration or being ranked lower relative to other existing machine learning models which may be under consideration).

In another example, evaluating the fitness of the existing machine learning model may include detecting biases or other shortcomings in the proposal for the proposed machine learning model. The processing system may notify the user of any detected biases or shortcomings, so that the user may optionally modify the proposal. The processing system may also consider, when evaluating the fitness of the existing machine learning model, whether the existing machine learning model may be able to compensate for any of the detected biases or shortcomings.

In step 210, the processing system may build a new machine learning model (e.g., a third machine learning model) that is consistent with the proposal for the proposed machine learning model by reusing a portion of the existing machine learning model. Thus, the new machine learning model may be considered a "hybrid" machine learning model in the sense that the new machine learning model merges features of existing machine learning models with proposed features or applications which may not have been present in the existing machine learning models. Several techniques for machine learning from other usages can be utilized within step 210. In one example, a simple serial concatenation of two models (e.g., the existing machine learning model and a smaller adaptation model) may be utilized together. In another example, a mixture of experts model may be trained to combine one or more existing machine learning models, with the output of each existing machine learning model numerically weighted for a combined or fused mixture of models. In yet another example, a rule-based contextual meta model (e.g., a model that conditionally switches entirely or with a weighted combination) between one or more existing machine learning models may be created. In still other examples, both transfer learning (e.g., reusing low-level deep neural network weightings which persist, but final output layers are lightly retrained) or style transfer learning (e.g., utilizing low-level deep neural network weightings, but applying secondary generative adversarial networks) may be utilized. In further examples still, methods for fast domain adaptation using support vector machines or reinforcement learning feature drift recognition may be applied and provided as new models.

It is assumed in step 210 that the existing machine learning model has been validated for fitness as described above. A specification for the new machine learning model may indicate the existing machine learning model that was reused, as well as the contributions of any other new or existing machine learning model components (e.g., versions, sources, etc.). In one example, metadata associated with the new machine learning model may indicate both the existing machine learning model(s) utilized to build the new machine learning model as well as any modifications that may have been made to the existing machine learning model(s) to adapt the existing machine learning model(s) to the use case for the proposed machine learning model.

In one example, step 210 may involve some form of user feedback in the building of the new machine learning model. For instance, the processing system may allow the user to direct the amount by which each reused feature of the existing machine learning model contributes to the new machine learning model. In an example, a graphical user interface (GUI) may be presented to the user including sliders which allow the user to easily adjust the extent (e.g., a weight amount) to which different features are reused.

In step 212, the processing system may monitor the performance of the new machine learning model in a deployment (e.g., runtime) environment. In one example, the monitoring involves detecting instances of mismatch between features of the proposal for the new machine learning model and features of the new machine learning model as deployed. In one example, the processing system may report any such instances of mismatch to the user. For instance, the processing system may utilize tools similar to the tools utilized to aid user understanding of fitness (described above) in order to present information about the instances of mismatch in an understandable manner. The instances of mismatch may relate, for example, to differences in model inputs, differences in model outputs, or deviations from target performance criteria.

In optional step 214 (illustrated in phantom), the processing system may update the new machine learning model. The updating may be performed subsequent to the new machine learning model being deployed in the deployment environment. For instance, in one example, the processing system may update the new machine learning model in response to the monitoring. For instance, if the monitoring indicates that one or more target performance criteria are not being met by the new machine learning model, then the processing system may update the new machine learning model in an attempt to improve the performance. In another example, the processing system may update the new machine learning model in response to new information about a component of the existing machine learning model which was reused in the building of the new machine learning model. For instance, newly discovered biases or other shortcomings in the existing machine learning model (or component thereof) may also affect the quality of the output produced by the new machine learning model.

In one example, updating the new machine learning model may involve repeating one or more of steps 206-212. For instance, updating of the new machine learning model may involve retraining the new machine learning model with newly acquired input features (acquired, for example, from another existing machine learning model (e.g., a third machine learning model) or changing a machine learning algorithm employed by the machine learning model. In a further example, portions of the code (e.g., code blocks or functions) of the new machine learning model may be modified, potentially with portions of code acquired from another existing machine learning model.

In optional step 216 (illustrated in phantom), the processing system may store data about the new machine learning model for later reuse (e.g., by future machine learning models). For instance, metadata may be associated with the new machine learning model that describes the new machine learning models inputs, outputs, and performance metrics, as well as any user feedback provided during the building and deployment of the new machine learning model (e.g., labeling, ranking, selections, etc.). Further examples of the present disclosure may employ enhanced metadata tagging which indicates why an existing machine learning model may have been accepted or rejected for re-use in a particular application. Thus, the metadata tags may provide a searchable material set that can be used to locate the new machine learning model for reuse.

The method 200 may end in step 218.

Thus, examples of the present disclosure provide an automated means for discovering machine learning pipeline models which are similar to a machine learning pipeline model being developed or deployed. Alternative features for a machine learning model that are generated during runtime creation may be evaluated in an efficient, automated manner. Contextually relevant metadata describing reusable model features may be applied to features of a new machine learning model. In some examples, external model systems may be accessed to evaluate the application of the external model systems to new machine learning applications (e.g., by evaluating context and user generated features through evaluation and feedback of applicability). Tools may be used to facilitate user understanding and feedback, thereby providing support for users who may lack data science backgrounds. Moreover, metadata describing the new machine learning model may be automatically updated to facilitate further reuse.

Further examples of the present disclosure may allow for inclusion of updates to a new machine learning model to mitigate for biases and performance issues pushed from upstream models. These updates may also allow for validation for unseen biases and/or data drift in the new machine learning model. As an example, a problem may be discovered with an upstream data dependency (e.g., credit rating), but the user may not be aware that the new machine learning model requires an update to address the problem or may not have access to a source with which to validate the update.

Further examples still may facilitate the creation of templates for building future machine learning models. For instance, in a specific class or type of model, it may be discovered that certain sources (e.g., customer care, historical performance, credit validation) should be included in the building of a new machine learning model.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Examples of the present disclosure may prove useful in a variety of areas in which machine learning applications are used. For instance, a user may be working on a business case in which the business's computer systems have not indexed any metadata. In this case, machine learning models, engineering machine learning features, and the like may be inventoried and indexed in an appropriate registry to facilitate reuse. Similarly, a user may be working on a dataset related to a business case, and a dataset from a prior use case which has a similar data structure to the current dataset may be detected in a registry. In this case, inventoried machine learning models, engineered machine learning features, and the like from the registry can be recommended for reuse. Similar data structures may be discovered within the registry based on metadata tags, requests for the registry to perform a self-test, or requests for the registry to perform self-correlation of new machine learning models.

In another example, when machine learning models are uploaded and saved, the code of the machine learning models may be scanned, and different code blocks or functions may be extracted and indexed for re-use based on metadata, surrounding logic, and/or library inclusions. Thus, portions of the code of a new machine learning model (as opposed to the entire new machine learning model) may be indexed for reuse. In addition, new machine learning models may also be scanned for reusable code blocks and functions while the code for the new machine learning models is being written (as opposed to upon upload of the new machine learning models).

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for building and deploying a machine learning model, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for building and deploying a machine learning model (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for building and deploying a machine learning model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
defining, by a processing system including at least one processor, a proposal for a proposed machine learning model to be built;
identifying, by the processing system, an existing machine learning model, wherein the existing machine learning model shares a similarity with the proposed machine learning model;

evaluating, by the processing system, a fitness of the existing machine learning model for reuse in building the proposed machine learning model;
building, by the processing system, a new machine learning model that is consistent with the proposed machine learning model by reusing a portion of the existing machine learning model; and
updating, by the processing system, the new machine learning model subsequent to the new machine learning model being deployed in a deployment environment, wherein the updating is performed in response to a bias being detected in input features used to train the existing machine learning model, wherein the updating includes retraining the new machine learning model with new input features, and wherein the updating improves a quality of an output produced by the new machine learning model by mitigating the bias.

2. The method of claim 1, wherein the proposal for the proposed machine learning model defines at least one of: a deployment need for the proposed machine learning model, data features that the proposed machine learning model will take as input, a target of the proposed machine learning model, a performance criterion of the proposed machine learning model, a source domain of the proposed machine learning model, or a target domain of the proposed machine learning model.

3. The method of claim 1, wherein the proposal for the proposed machine learning model is defined with inputs received from a human user.

4. The method of claim 1, wherein the similarity comprises a similarity in data feature inputs.

5. The method of claim 1, wherein the similarity comprises a similarity in target outputs.

6. The method of claim 1, wherein the similarity is detected when metadata associated with the existing machine learning model matches metadata associated with the proposal for the proposed machine learning model.

7. The method of claim 6, wherein the metadata associated with the existing machine learning model identically matches metadata associated with the proposal for the proposed machine learning model.

8. The method of claim 6, wherein the metadata associated with the existing machine learning model semantically or conceptually matches metadata associated with the proposal for the proposed machine learning model.

9. The method of claim 6, wherein a match between the metadata associated with the existing machine learning model and the metadata associated with the proposal for the proposed machine learning model is assigned a score, and the identifying comprises determining that the score at least meets a predefined threshold score.

10. The method of claim 1, wherein the evaluating further comprises validating input features of the existing machine learning model to measure at least one of: a drift or the bias.

11. The method of claim 1, wherein the evaluating further comprises evaluating an alignment of predictions generated by the existing machine learning model with predictions that the proposed machine learning model are intended to generate.

12. The method of claim 1, wherein the evaluating further comprises retraining the existing machine learning model.

13. The method of claim 1, wherein the evaluating further comprises ranking a plurality of existing machine learning models, including the existing machine learning model which is identified, according to fitness for reuse in building the proposed machine learning model.

14. The method of claim 1, wherein the evaluating further comprises breaking apart the existing machine learning model and presenting examples of inputs and outputs of the existing machine learning model to a human user for manual review.

15. The method of claim 1, wherein the updating further comprises reporting an instance of a mismatch between a feature of the proposal for the proposed machine learning model and a feature of the new machine learning model in the deployment environment.

16. The method of claim 1, further comprising:

storing, by the processing system, the new machine learning model along with metadata that describes at least one of: input features of the new machine learning model, output features of the new machine learning model, a performance metric of the new machine learning model, user feedback provided during building and deployment of the new machine learning model, or portions of the existing machine learning model which were used to build the new machine learning model.

17. The method of claim 1, wherein the updating uses a portion of at least one of: the existing machine learning model, or another existing machine learning model.

18. A non-transitory computer-readable medium storing instructions which, when executed by a processing system including at least one processor, cause the processing system to perform operations, the operations comprising:

defining a proposal for a proposed machine learning model to be built;

identifying an existing machine learning model, wherein the existing machine learning model shares a similarity with the proposed machine learning model;

evaluating a fitness of the existing machine learning model for reuse in building the proposed machine learning model;

building a new machine learning model that is consistent with the proposal for the proposed machine learning model by reusing a portion of the existing machine learning model; and updating the new machine learning model subsequent to the new machine learning model being deployed in a deployment environment, wherein the updating is performed in response to a bias being detected in input features used to train the existing machine learning model, wherein the updating includes retraining the new machine learning model with new input features, and wherein the updating improves a quality of an output produced by the new machine learning model by mitigating the bias.

19. A device comprising:

a processing system including at least one processor; and a non-transitory computer-readable medium storing instructions which, when executed by the processing system, cause the processing system to perform operations, the operations comprising:

defining a proposal for a proposed machine learning model to be built;

identifying an existing machine learning model, wherein the existing machine learning model shares a similarity with the proposed machine learning model;

evaluating a fitness of the existing machine learning model for reuse in building the proposed machine learning model;

building a new machine learning model that is consistent with the proposal for the proposed machine learning model by reusing a portion of the existing machine learning model; and updating the new machine learning model subsequent to the new machine learning model being deployed in a deployment environment, wherein the updating is performed in response to a bias being detected in input features used to train the existing machine learning model, wherein the updating includes retraining the new machine learning model with new input features, and wherein the updating improves a quality of an output produced by the new machine learning model by mitigating the bias.

20. The device of claim 19, wherein the proposal for the proposed machine learning model defines at least one of: a deployment need for the proposed machine learning model, data features that the proposed machine learning model will take as input, a target of the proposed machine learning model, a performance criterion of the proposed machine learning model, a source domain of the proposed machine learning model, or a target domain of the proposed machine learning model.

* * * * *